United States Patent
Park

(10) Patent No.: US 10,487,895 B2
(45) Date of Patent: Nov. 26, 2019

(54) SELF-TOLERANCE COMPENSATING S-CAM BRAKE SYSTEM AND VEHICLE HAVING THE SAME

(71) Applicants: HYUNDAI MOTOR COMPANY, Seoul (KR); KIA MOTORS CORPORATION, Seoul (KR)

(72) Inventor: Hyung-Bin Park, Jeonju-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 42 days.

(21) Appl. No.: 15/836,770

(22) Filed: Dec. 8, 2017

(65) Prior Publication Data

US 2019/0093721 A1 Mar. 28, 2019

(30) Foreign Application Priority Data

Sep. 26, 2017 (KR) .................. 10-2017-0123946

(51) Int. Cl.
| | |
|---|---|
| *F16D 65/38* | (2006.01) |
| *F16D 51/14* | (2006.01) |
| *F16D 51/24* | (2006.01) |
| *F16D 65/22* | (2006.01) |
| *F16D 65/02* | (2006.01) |
| *F16D 65/62* | (2006.01) |
| *F16D 65/68* | (2006.01) |
| *F16D 125/30* | (2012.01) |

(52) U.S. Cl.
CPC .............. *F16D 65/38* (2013.01); *F16D 51/14* (2013.01); *F16D 51/24* (2013.01); *F16D 65/028* (2013.01); *F16D 65/22* (2013.01); *F16D 65/62* (2013.01); *F16D 65/68* (2013.01); *F16D 2125/30* (2013.01)

(58) Field of Classification Search
CPC .......... F16D 65/04; F16D 65/08; F16D 65/38; F16D 51/14; F16D 65/028; F16D 65/22; F16D 65/022
See application file for complete search history.

(56) References Cited

U.S. PATENT DOCUMENTS

| | | | | |
|---|---|---|---|---|
| 3,650,360 | A * | 3/1972 | King ................. | F16D 51/22 188/250 C |
| 2015/0075926 | A1* | 3/2015 | Moss ................. | F16D 51/00 188/219.1 |
| 2016/0341266 | A1* | 11/2016 | Oliver ............... | F16D 51/28 |
| 2017/0016496 | A1* | 1/2017 | Church ............. | F16D 65/0006 |

(Continued)

FOREIGN PATENT DOCUMENTS

| | | |
|---|---|---|
| JP | 2006-250252 A | 9/2006 |
| KR | 10-1491331 B1 | 2/2015 |

(Continued)

*Primary Examiner* — Melanie Torres Williams
(74) *Attorney, Agent, or Firm* — Knobbe Martens Olson & Bear LLP

(57) ABSTRACT

An S-cam brake system having is disclosed. The system includes a roller assembly, an S-cam, a shoe, and an S-cam brake. The roller assembly is configured to allow relative movement between a roller and a roller pin. The roller assembly is interposed between the S-cam and the shoe. Relative movement between a roller and a roller pin can compensates a defect in machining the outer contact surface of the S-cam roller or a defect in concentricity of roller seating depressions of the shoe.

17 Claims, 6 Drawing Sheets

(56) References Cited

U.S. PATENT DOCUMENTS

2017/0030422 A1\* 2/2017 Berwanger ............. F16D 51/22
2017/0343070 A1\* 11/2017 Schwartz ................ F16D 65/22
2018/0058525 A1\* 3/2018 Kasper .................. B60T 13/741

FOREIGN PATENT DOCUMENTS

KR     10-2015-0069330 A    6/2015
KR         10-1596693 B1     2/2016

\* cited by examiner

SELF-TOLERANCE COMPENSATING S-CAM BRAKE SYSTEM AND VEHICLE HAVING THE SAME

CROSS-REFERENCE TO RELATED APPLICATIONS

This application claims priority to Korean Patent Application No. 10-2017-0123946, filed on Sep. 26, 2017, which is incorporated herein by reference in its entirety.

BACKGROUND

Field

The present disclosure relates to an S-cam brake system.

Description of Related Art

In general, an S-cam type brake is operated in such a way as to generate force of braking a vehicle using rotating force of an S-cam by compressed air supplied when a brake pedal is operated.

For example, the S-cam type brake includes a shoe assembly provided with frictional members, a chamber configured to receive compressed air during a braking operation, an S-cam configured to rotate by movement of a slack adjuster pushed by the chamber supplied with compressed air, and a roller assembly configured such that the left and right shoes are pushed by rollers that are assembled with respective left and right shoes of the shoe assembly and brought into contact with an S-cam head on left and right sides of the S-cam.

Therefore, in the S-cam type brake, the left and right shoes are uniformly pushed by rotation of the S-cam, so that braking stability is secured without a difference in frictional force between the left and right frictional members relative to a drum. Thus, the S-cam type brake is mainly applied to large commercial vehicles that use a drum brake.

The disclosure of this section is to provide background of the invention. Applicant notes that this section may contain information available before this application. However, by providing this section, Applicant does not admit that any information contained in this section constitutes prior art.

SUMMARY

In a S-cam type brake, each roller is brought into line contact with the head of the S-cam and vertically seated on a corresponding one of the left and right shoe assemblies. Hence, the S-cam type brake is designed with a very narrow allowable range with respect to a manufacturing defect or a design tolerance error. High concentricity with respect to two roller seating surfaces is desirable for a braked shoe. A defect in machining an outer surface of the S-cam is not desirable. Here, the concentricity may be satisfied when respective axes of two depressions formed in the shoe are aligned with each other or the degree of misalignment therebetween is within a tolerance range.

A defect in concentricity of the shoe or a defect in machining the outer surface of the S-cam may cause distortion of the assembled roller. As a result, during the operation of pushing the roller by the head of the S-cam, because the shoe is pushed in a state in which a roller pin of the roller is not vertically seated on the roller seating surfaces of the shoe, the roller has no choice but to push only one side of the shoe assembly. Then, the drum and the lining make one-sided contact while the shoe assembly is in a distorted state. Thus, one-sided wear of the lining is caused, thereby generating vibrations and braking noise due to partial contact between the lining and the drum. Particularly, braking noise develops into chattering having a certain frequency (e.g., 45 Hz).

Furthermore, to facilitate rotation of the roller when the S-cam is rotated, the roller assembly is assembled in such a way that the roller and the roller pin are loosely fitted to each other after an inner circumferential surface of the roller and an outer circumferential surface of the roller pin have been precisely machined. Therefore, when the roller assembly is transferred or is assembled with a brake system (e.g., a drum assembly), the roller pin may be removed from the roller if the roller assembly is tilted to one side.

An embodiment of the present invention is directed to a vehicle provided with a self-tolerance compensating S-cam brake system, in which a roller absorbs a defect in machining an outer circumferential contact surface of the roller relative to an S-cam or a defect in concentricity of a roller seating depression of the shoe and thus functions to uniformly transmit force between the S-cam and the shoe, thus preventing one-sided wear of a lining during a braking operation, and particularly, which employs a retainer, thus preventing a roller pin from being undesirably removed from the roller during an assembly or transfer process, despite having a structure in which the roller and the roller pin remain loosely fitted to each other.

Other objects, features and advantages of the present invention can be understood by the following description, and become apparent with reference to embodiments of the present invention. Also, it is obvious to those skilled in the art to which the present invention pertains that the objects and advantages of the present invention can be realized by the means as claimed and combinations thereof.

In accordance with an embodiment of the present invention, there is provided an S-cam brake system including a roller pin, and a roller having a pin hole into which the roller pin is inserted. The pin hole may have an inner circumferential surface with a predetermined curvature as a pin contact surface, and due to the curvature, a contact section and a non-contact section may be formed between the inner circumferential surface of the pin hole and an outer circumferential surface of the roller pin so that relative movement of the roller and relative movement of the roller pin are generated between the roller and the roller pin.

The curvature may be formed with a convex protrusion of the pin contact surface as a peak. The protrusion may be disposed at a position corresponding to ½ of an overall length of the roller.

The relative movement of the roller may make rotation of the roller relative to the roller pin, thus converting a defective partial contact state of the roller due to a machining tolerance error into a contact state of the roller. The relative movement of the roller pin may make rotation of the roller pin relative to the roller, thus converting a defective concentric close contact state of the roller pin due to a machining tolerance error into a close contact state of the roller pin.

The roller and the roller pin that are coupled to each other may be assembled with a retainer, and the retainer that is fixed to the roller pin may lock a side surface of the roller in place. The roller pin may include: a pin body inserted into the pin hole; left and right pin ends extending from respective left and right sides of the pin body to protrude out of the roller; and an annular groove formed around a circumferential surface of each of the left and right pin ends, wherein the retainer comprises left and right retainers respectively fitted into the annular groove of the left pin end and the annular groove of the right pin end.

The roller, the roller pin and the retainer may form a roller assembly, and an S-cam brake may include the roller assembly.

In accordance with an embodiment of the present invention, there is provided a vehicle provided with an S-cam brake system. The S-cam brake system may include: a roller assembly having a roller and a roller pin coupled to each other by a retainer and configured such that a contact section and a non-contact section between the roller and the roller pin are formed using a curved inner circumferential surface of a pin hole so that movement of the roller and movement of the roller pin can be caused; an S-cam configured to push the roller assembly; a shoe configured to be pushed by the roller assembly; and a slack adjuster configured to be pushed by a brake chamber supplied with compressed air and thus rotate the S-cam.

The roller assembly may include a pair of first and second roller assemblies, and the shoe may include a pair of left and right shoes. The first roller assembly may be disposed on the left shoe on a left side of the S-cam, and the second roller assembly may be disposed on the right shoe on a right side of the S-cam. Each of the first and second assemblies may include a roller into which a roller pin is inserted and coupled, the roller being configured such that rotation of the roller relative to the roller pin and rotation of the roller pin are generated.

While the roller makes contact with each of left and right cam head outer surfaces of the S-cam, the rotation of the roller may convert a defective partial contact state of the roller relative to a corresponding one of the left and right cam head outer surfaces into a contact state of the roller. While the roller pin makes contact with each of the left and right shoes, the movement of the roller pin may convert a defective concentric close contact state of the roller pin relative to a corresponding one of the left and right shoes into a close contact state of the roller pin.

The compressed air may be generated by a pneumatic apparatus when a brake pedal is operated. The operation of pushing the slack adjuster may be embodied by coupling of a chamber push rod of the brake chamber to the slack adjuster, and the rotation of the S-cam may be performed when a cam shaft extending from a central portion of an "S"-shaped cam head of the S-cam is rotated by the slack adjuster.

The S-cam brake may be installed on each of left and right wheels.

DETAILED DESCRIPTION

Figure 1:
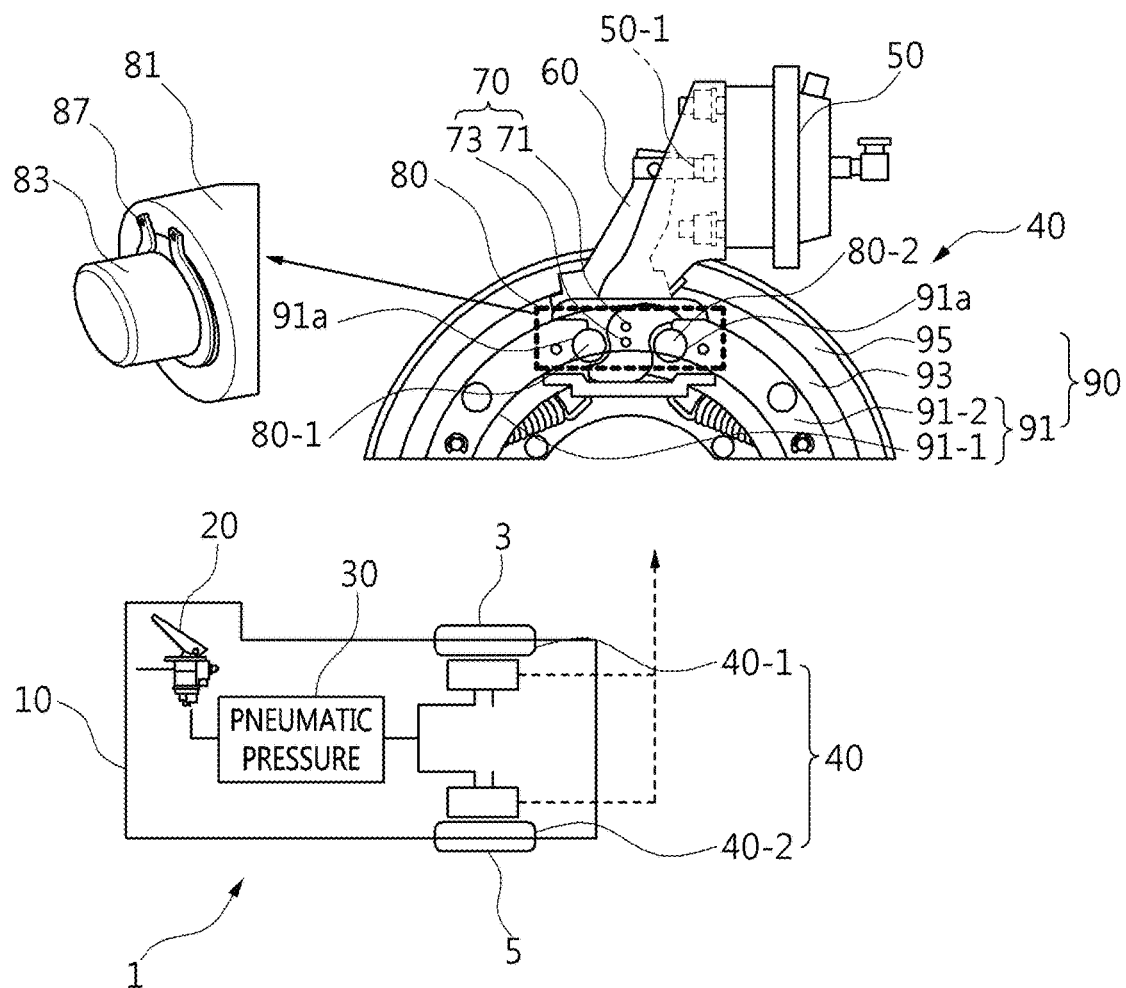
FIG. 1 is a diagram illustrating the configuration of a self-tolerance compensating S-cam brake applied to a vehicle according to embodiments of the present invention.

Embodiments of the present invention will be described below in more detail with reference to the accompanying drawings to be easily realized by those skilled in the art.

The present invention may, however, be embodied in different forms and should not be construed as limited to the embodiments set forth herein. In certain embodiments, irrelevant to the present invention may be omitted to avoid obscuring appreciation of the disclosure. Throughout the disclosure, like reference numerals refer to like parts throughout the various figures and embodiments of the present invention.

In embodiments, in a brake system of a vehicle, a roller assembly 80-1, 80-2 is interposed between S-shaped cam 70 and a brake shoe 91-1, 91-2. The roller assembly 80-1, 80-2 includes a roller 81 having a through hole 82, and a roller pin 83 passing through the through hole 82. In embodiments, the through hole 82 is generally symmetric about a central axis. In embodiments, the roller pin 83 is a cylinder symmetric about a central axis.

In embodiments, when viewed in a cross-section taken along the central axis (FIG. 3), internal surface of the roller 82-1 defining through hole 82 has a radius of curvature R. In embodiments, in cross-sections perpendicular to the central axis, through hole 82 has a first cross-sectional area at an end of the roller and a first cross-sectional area smaller than the first cross-sectional area at the middle of the roller (½ L from the one end of the roller along the central axis) such that, when the roller 81 and the roller pin 83 aligned about the same central axis, the roller pin 83 contacts the internal surface 81-2 at the middle of the roller and is separated from 81-2 with a gap. This gap allows relative movement between of the roller 81 and the roller pin 83.

Figure 5:
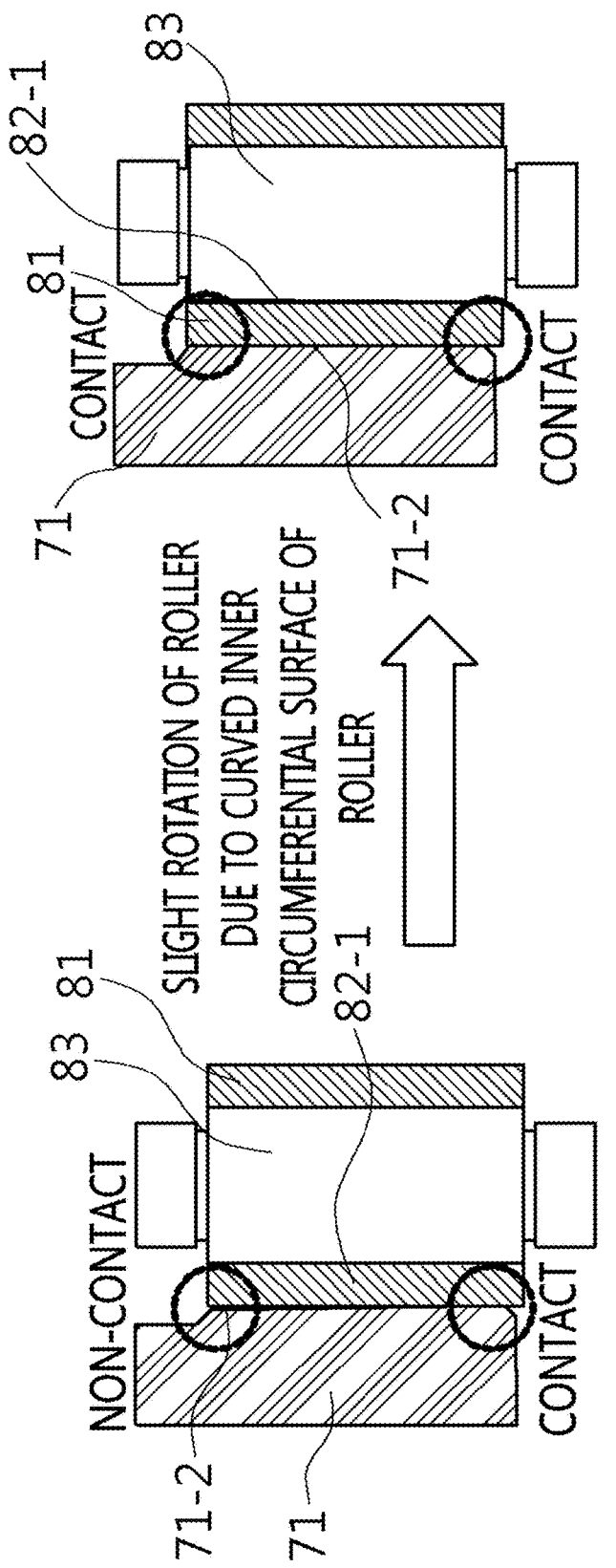
FIG. 5 is a view illustrating a self-tolerance compensated state of the roller assembly interlocked with the S-cam according to embodiments of the present invention.

In embodiments, during a barking operation (when s-shape cam 70 rotates to push roller 81 and thereby roller pin 83 pushes brake shoe 91), relative movement between of the roller 81 and the roller pin 83 (illustrated in FIGS. 5 and 6) makes the roller pin contact both of the two brake shoe plate 91A, 91B at the same time, and also maintains a line contact substantially throughout the length of s-cam cam 70 (as illustrated in stable contact of FIG. 5).

Referring to FIG. 1, a vehicle 1 includes an S-cam brake system 10 installed on each of left and right wheels 3 and 5. The S-cam brake system 10 includes an S-cam brake 40 configured to generate braking force using compressed air generated from a pneumatic apparatus 30 when a brake pedal 20 is operated. The S-cam brake 40 is divided into a left S-cam brake 40-1 installed on the left wheel 3, and a right S-cam brake 40-2 installed on the right wheel 5.

Particularly, each of the left and right S-cam brakes 40-1 and 40-2 includes a roller 81 and a roller pin 83 which are disposed between an S-cam 70 and a shoe 91 and configured to perform self-tolerance compensation so that an allowable range of a design tolerance error pertaining to a defect in machining an outer surface of the S-cam 70 or a defect in concentricity of the shoe 91 can extend, whereby one-sided wear and noise/vibration of a lining 93 can be prevented.

In detail, the S-cam brake 40 includes a brake chamber 50, a slack adjuster 60, the S-cam 70, a roller assembly 80, and a drum assembly 90. In other words, each of the left and right S-cam brakes 40-1 and 40-2 includes the brake chamber 50, the slack adjuster 60, the S-cam 70, the roller assembly 80, and the drum assembly 90. Hence, the terms "left and right S-cam brakes 40-1 and 40-2" are terms used only for distinguishing between the S-cam brakes 40 installed on the respective left and right wheels 3 and 5.

In an embodiment, when the brake pedal 20 is operated, the brake chamber 50 is supplied with compressed air generated from the pneumatic apparatus 30, and pushes a chamber push rod 50-1 coupled to the slack adjuster 60. The slack adjuster 60 is pushed by the chamber push rod 50-1, thereby rotating the S-cam 70.

For example, the S-cam 70 that is rotated by the movement of the slack adjuster 60 pushes a pair of left and right roller assemblies 80-1 and 80-2 constituting the roller assembly 80 in left and right directions of the S-cam 70, respectively. To this end, the S-cam 70 includes a cam head 71 which is provided on left and right sides thereof with the left and right roller assemblies 80-1 and 80-2, respectively, and a cam shaft 73 which extends from the central portion of the cam head 71 and is coupled to the slack adjuster 60 so that the cam shaft 73 can be rotated by the movement of the slack adjuster 60. Particularly, the cam head 71 has left and right cam head outer surfaces 71-1 and 71-2 that are shaped in the form of "S". The left roller assembly 80-1 is disposed on the left cam head outer surface 71-1, and the right roller assembly 80-2 is disposed on the right cam head outer surface 71-2. To this end, each of the left and right cam head outer surfaces 71-1 and 71-2 is machined within an allowable range of a design tolerance error such that it comes into line contact with a corresponding one of the left and right roller assemblies 80-1 and 80-2.

In an embodiment, the roller assembly 80 includes the roller 81, the roller pin 83, and retainers 87 including a pair of left and right retainers 87-1 and 87-2. In detail, each of the left and right roller assemblies 80-1 and 80-2 includes the roller 81, the roller pin 83, and the retainers 87 including the left and right retainers 87-1 and 87-2. Hence, the terms "left and right roller assemblies 80-1 and 80-2" are terms used only for distinguishing between the roller assemblies 80 respectively installed on the left and right cam head outer surfaces 71-1 and 71-2 of the S-cam 70.

In an embodiment, the drum assembly 90 includes shoes 91 including a pair of left and right shoes 91-1 and 91-2, a lining 93 placed over the left and right shoes 91-1 and 91-2 and configured to generate frictional force, and a drum 95 installed on each of the left and right wheels 3 and 5 and configured to generate frictional braking force with the lining 93. Particularly, referring to FIG. 4, each of the left and right shoes 91-1 and 91-2 includes a pair of first and second shoe ends 91A and 91B which faces each other with a facing space formed therebetween. A roller seating surface 91a is formed in each of the first and second shoe ends 91A and 91B such that the concentricity is formed within the allowable range of the design tolerance error. Therefore, the roller seating surfaces 91a formed in the respective first and second shoe ends 91A and 91B are coupled to opposite left and right ends of the roller pin 83 of the roller assembly 80 with the desired concentricity.

Figure 2:
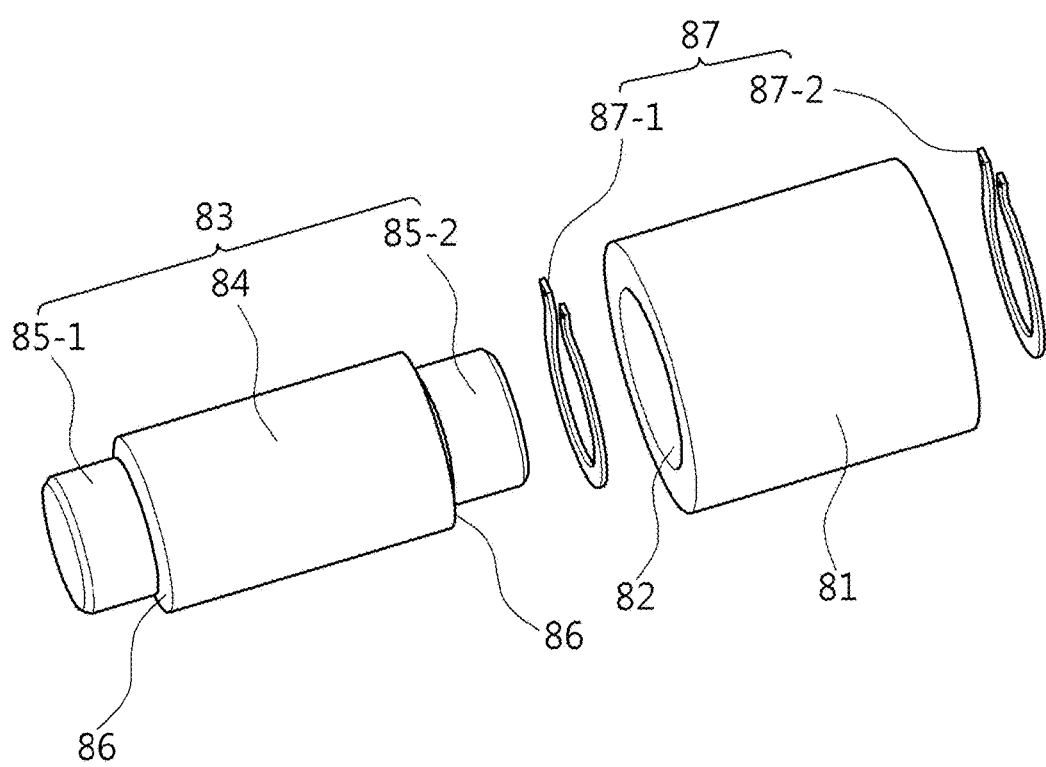
FIG. 2 is an exploded perspective view illustrating a roller assembly of the self-tolerance compensating S-cam brake according to embodiments of the present invention.

FIG. 2 is an exploded perspective view illustrating the configuration of the roller assembly 80 including the roller 81, the roller pin 83 and the retainers 87.

The roller 81 has a hollow pipe structure having a pin hole 82 passing through a roller body. Particularly, the roller 81 has an overall length L suitable for inserting the roller 81 into the facing space of the first and second shoe ends 91A and 91B illustrated in FIG. 4.

The roller pin 83 includes a pin body 84, left and right pin ends 85-1 and 85-2 which respectively extend from left and right ends of the pin body 84, and each of which has a diameter less than a diameter of the pin body 84, and an annular groove 86 which is formed around an outer circumferential surface of each of the left and right pin ends 85-1 and 85-2 at a position distinct from the pin body 84. Particularly, the pin body 84 has an overall length identical with the overall length L of the roller 81.

The retainers 87 includes a left retainer 87-1 that is fitted into the annular groove 86 of the left pin end 85-1, and includes a right retainer 87-2 that is fitted into the annular groove 86 of the right pin end 85-2. Each of the left and right retainers 87-1 and 87-2 equally has an annular shape with an opening formed between opposite ends thereof.

Figure 3:
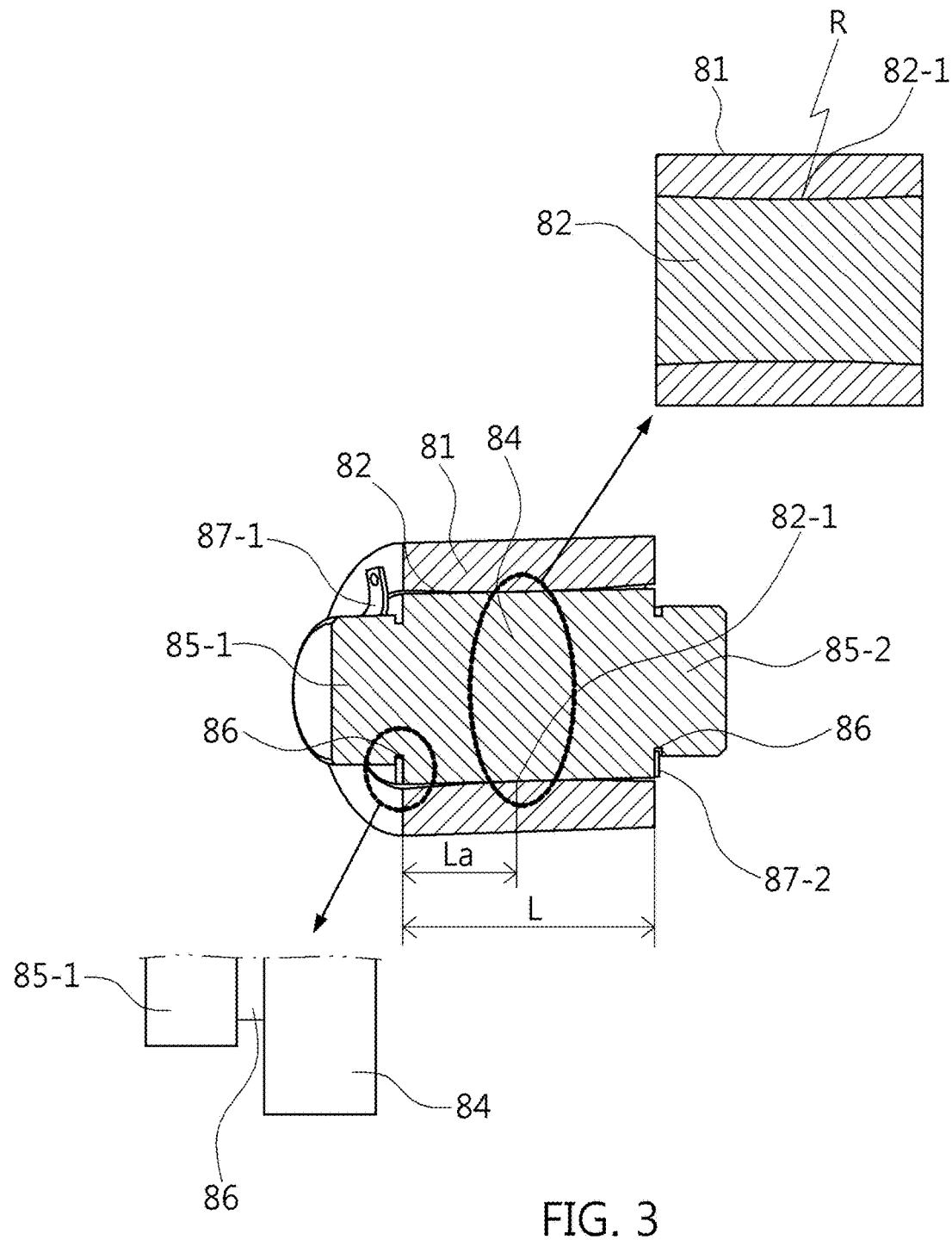
FIG. 3 is an assembled sectional view of the roller assembly according to embodiments of the present invention.

FIG. 3 is an assembled sectional view illustrating the roller assembly 80 including the roller 81, the roller pin 83, and the left and right retainers 87-1 and 87-2.

The roller 81 is coupled with the roller pin 83 by inserting the pin body 84 into the pin hole 82. The left and right retainers 87-1 and 87-2 are respectively fitted into the annular grooves 86 of the left and right pin ends 85-1 and 85-2 and fixed in the annular grooves 86 in the state in which the left and right retainers 87-1 and 87-2 are coupled to the roller pin 83. Therefore, in the roller assembly 80 formed by assembling the roller 81, the roller pin 83, and the left and right retainers 87-1 and 87-2, relative movement of the roller 81 and the roller pin 83 that are coupled to each other by the left and right retainers 87-1 and 87-2 is limited. Thus, the components of the roller assembly 80 can be prevented from being separated or removed from each other when the roller assembly 80 is transferred or stored after having being assembled.

Furthermore, the pin hole 82 into which the pin body 84 is inserted so that the roller 81 and the roller pin 83 are coupled to each other has a pin contact surface 82-1 on an inner circumferential surface thereof. The pin contact surface 82-1 has a radius R such that a half overall length La that is ½ of the overall length L of the roller 81 corresponds to the peak of a convex structure of the pin contact surface 82-1. Particularly, the radius R is formed such that the minimum inner diameter of the pin hole 82 is formed at the peak (i.e., the position corresponding to the half overall length La of the roller 81) of the convex structure of the pin contact surface 82-1, and the maximum inner diameter of the pin hole 82 is formed at opposite left and right ends (i.e., left and right ends of the roller 81) of the pin contact surface 82-1. Therefore, the pin body 84 inserted into the pin hole 82 is not brought into contact with the maximum inner diameter portion of the pin hole 82 in a state in which the pin body 84 is brought into contact with the minimum inner diameter portion of the pin hole 82. Thus, the roller 81 can move relative to the roller pin 83, and the roller pin 83 can move relative to the roller 81.

For example, the movement of the roller 81 is caused in a defective partial line contact state of a cam-roller contact surface A (refer to FIG. 5) that results from a defect in machining the outer surfaces of the left and right cam head outer surfaces 71-1 and 71-2 while the roller 81 is coupled with the S-cam 70. The movement of the roller pin 83 is caused in a defective concentric state of left and right shoe-pin contacts B and C (refer to FIG. 6) that results from formation of incomplete concentricity of the roller seating surfaces 91a while the roller pin 83 is coupled to the left and right shoes 91-1 and 91-2. In other words, the movement of the roller 81 pushed by the S-cam 70 in the defective partial line contact state of the cam-roller contact surface A is converted into rotation of the roller 81. Furthermore, the movement of the roller pin 83 pushed by the roller 81 in the defective concentric state of the left and right shoe-pin contacts B and C is converted into rotation of the roller pin 83 on any one of left and right shoe-pin contact surfaces B and C. Each of the rotation of the roller and the rotation of the roller pin is defined as an angular rotation in whiccontch it is slightly rotated within an angular range of approximately 90 degrees when one revolution is a 360-degree revolution. This structure may be changed such that the range of the angular rotation extends to an angular range of 180 degrees, as needed.

Figure 4:
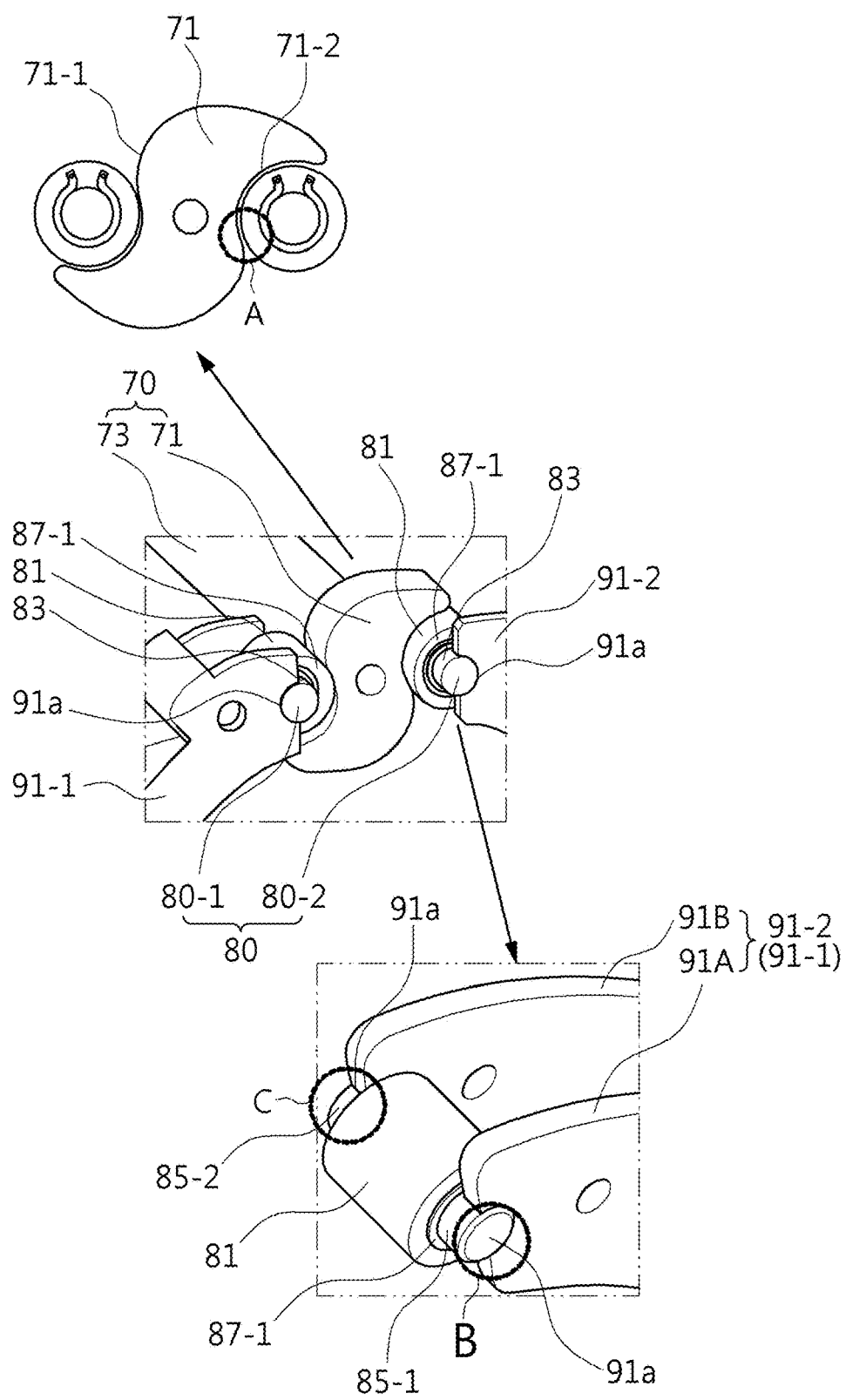
FIG. 4 is a view illustrating an assembled state among the roller assembly, an S-cam, and a shoe according to embodiments of the present invention.

Referring to FIG. 4, there is illustrated an example in which the S-cam 70 and each of the two rollers 81 form the cam-roller contact surface A making line contact, and the two roller pins 83 and the left and right shoes 91-1 and 91-2 form the left and right shoe-pin contact surfaces B and C each making concentric contact.

In detail, the cam-roller contact surface A is formed by disposing the roller 81 on each of the left and right cam head outer surfaces 71-1 and 71-2 of the cam head 71 forming the S cam 70, and by coming the outer circumferential surface of the roller 81 into contact with the corresponding one of the S-shaped left and right cam head outer surfaces 71-1 and 71-2. In this case, in the cam-roller contact surface A, if the dimensions of each of the left and right cam head outer surfaces 71-1 and 71-2 are out of the allowable range of the design tolerance error when it is machined, the line contact of each of the left and right cam head outer surfaces 71-1 and 71-2 with the outer circumferential surface of the corresponding roller 81 may be uneven.

Each of the left and right shoe-pin contact surfaces B and C is formed by inserting the corresponding roller 81 into the facing space of the first and second shoe ends 91*a* and 91*b* forming each of the left and right shoes 91-1 and 91-2, and by coming the outer circumferential surfaces of the left and right pin ends 85-1 and 85-2 of the roller pin 83 coupled to the roller 81 into contact with the roller seating surface 91*a* of the first and second shoe ends 91*a* and 91*b*. In this case, in each of the left and right shoe-pin contact surfaces B and C, when the concentricity of the roller seating surface 91*a* is out of the allowable range of the design tolerance error, the concentricity of the roller seating surface 91*a* with respect to the outer circumferential surface of the left and right pin ends 85-1 and 85-2 may be incompletely formed.

Referring to FIG. 5, there is illustrated the case where an uneven overall-length section contact state of the cam-roller contact surface A is converted into an even overall-length section contact state by movement, i.e., rotation, of the roller 81.

In an initial contact state (a) of FIG. 5, when the S-cam 70 is rotated by interlocking operation of the pneumatic apparatus 30, the brake chamber 50 and the slack adjuster 60 when the brake pedal 20 is operated, a contact section and a non-contact section are formed, with respect to the overall length direction of the roller 81, between the left cap head outer surface 71-1 and the roller 81 due to a defect in machining the left cam head outer surface 71-1, whereby the cam-roller contact surface A enters an uneven overall-length contact state. If the S cam 70 is further rotated to push the roller 81, the roller 81 is slightly rotated (refer to a contact stabilization step (f) of FIG. 6) in a counterclockwise direction in response to the rotation of the S-cam 70 due to the pin contact surface 82-1 formed with a curvature on the inner circumferential surface of the pin hole 82. The counterclockwise directional rotation of the roller 81 converts the non-contact section that has been formed by the left cam head outer surface 71-1 and the roller 81 with respect to the overall length direction of the roller 81, into a contact section. Here, the rotation of the roller 81 is performed in the incomplete concentric state of the left and right shoe-pin contact surfaces B and C.

As a result, the rotation of the roller 81 makes the cam-roller contact surface A enter the even overall-length contact state without having the non-contact section, as shown in a stable contact stage (b) of FIG. 5.

Figure 6:
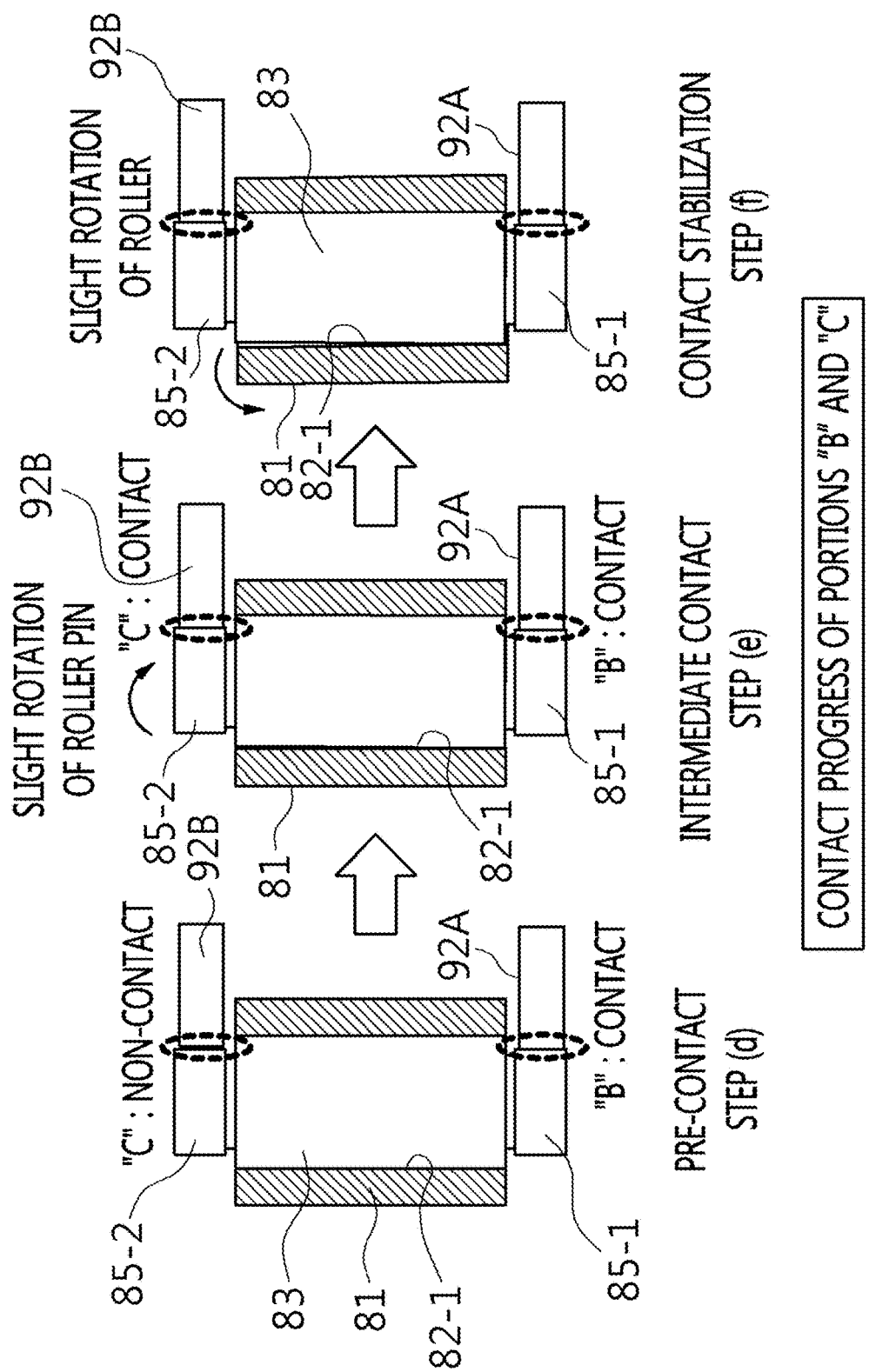
FIG. 6 is a view illustrating a self-tolerance compensated state of the roller assembly interlocked with the shoe according to embodiments of the present invention.

Referring to FIG. 6, there is illustrated the case where the incomplete concentric state of the right shoe-pin contact surface C of the left and right shoe-pin contact surfaces B and C is converted into a complete concentric state by movement, i.e., rotation, of the roller pin 83.

In a pre-contact step (d) of FIG. 6, the left pin end 85-1 of the left and right pin ends 85-1 and 85-2 of the roller pin 83 disposed in the roller seating surfaces 91*a* of the first and second shoe ends 91A and 91B forming the left shoe 91-1 is in a concentric state (i.e., a correct concentric state), but the right pin end 85-2 is in a incomplete concentric state (i.e., an incorrect concentric state). In other words, this refers to a pre-brake step.

In an intermediate contact step (e) of FIG. 6, when the roller 81 pushes the left shoe 91-1 by the S-cam 70 during a braking operation, the roller pin 83 is moved, i.e., rotated. In detail, if the right shoe-pin contact surface C is in the incomplete concentric state unlike the left shoe-pin contact surface B that is in the complete concentric state, the left shoe-pin contact surface B functions as an axis when the roller 81 and the roller pin 83 that are pushed by the rotation of the S-cam 70 pushes the left shoe 91-1, so that the right shoe-pin contact surface C is slightly rotated in a clockwise direction. As a result, due to the clockwise directional rotation of the right shoe-pin contact surface C, the right pin end 85-2 of the roller pin 83 comes into close contact with the roller seating surface 91*a* of the second shoe end 91B. Therefore, both the left and right shoe-pin contact surfaces B and C are converted into the complete concentric state.

In the contact stabilization step (f) of FIG. 6, the roller 81 that is further pushed by the rotation of the S-cam 70 from the complete concentric state of the left and right shoe-pin contact surfaces B and C is slightly rotated in the counterclockwise direction, whereby the even overall-length contact state of the cam-roller contact surface A that is formed in the stable contact stage (b) is stabilized.

Consequently, since the counterclockwise directional rotation of the roller 81 resulting from the movement of the roller 81 in FIG. 5 and the clockwise directional rotation of the roller pin 83 resulting from the movement of the roller pin 83 in FIG. 6 absorb the defect in machining the left and right cam head outer surfaces 71-1 and 71-2 and the defect in concentricity of the roller seating surface 91*a*, the roller pin 83 pushed along with the roller 81 pushes the left and right shoes 91-1 and 91-2 in a direction perpendicular to the drum 95. As a result, the braking operation of the vehicle 1 can be performed without one-sided contact between the lining 3 and the drum 95.

As described above, the self-tolerance compensating S-cam brake system according to embodiments of the present disclosure includes the roller assembly 80, the S-cam 70, the shoe 90, and the S-cam brake 40. The roller assembly 80 is configured to generate relative movement of the roller 81 and relative movement of the roller pin 83 by forming the contact section and the non-contact section between the roller 81 and the roller pin 83 using the curved inner circumferential surface of the pin contact surface 82-1 of the pin hole 82. The S-cam 70 and the shoe 90 are provided with the roller assembly 80 interposed therebetween. The S-cam brake 40 is provided with the slack adjuster 60 which is pushed by the brake chamber 50 supplied with compressed air so as to rotate the S-cam 70. Therefore, a defect in machining the outer contact surface of the S-cam roller or a defect in concentricity of the roller seating depressions of the shoe can be compensated for, whereby one-sided wear of the lining can be prevented from occurring during a braking operation. Particularly, despite the structure in which the roller 81 and the roller pin 83 remain loosely fitted to each other, the roller pin 83 can be prevented by the retainers 87 from being undesirably removed when it is assembled or transferred.

A vehicle according to embodiments of the present invention employing an S-cam brake system configured of an S-cam brake with a roller having a self-tolerance compensating function has the following effects.

First, despite using an S-cam type brake, the present invention can markedly extend an allowable range of a design tolerance error pertaining both to a defect in machining an outer surface of an S-cam that makes contact with the roller and to a defect in concentricity of roller seating surfaces of left and right shoes. Second, the present invention can prevent one-sided wear of a lining and noise/vibrations due to a one-sided contact phenomenon which is caused during a braking operation by a defect in machining an outer circumferential surface of a head of the S-cam assembled with the roller or a defect in concentricity of the roller seating depressions of the shoe. Third, because noise/vibrations can be prevented during the braking operation, the braking noise is prevented from developing into chattering having a certain frequency (e.g., 45 Hz). Fourth, a retainer having a simple structure is used to fix the roller and the roller pin to each other, so that the problem of removal of the roller pin from the roller during the assembly or transfer process can be solved without a major change of design or addition of a separate part. Fifth, because the roller and the roller pin remain loosely fitted to each other, the performance of the S-cam type brake can be improved with almost no change in design of the existing roller assembly.

While the present invention has been described with respect to certain embodiments, it will be apparent to those skilled in the art that various changes and modifications may be made without departing from the spirit and scope of the invention as defined in the following claims.

What is claimed is:

1. An S-cam brake system comprising
a roller pin, and a roller having a pin hole into which the roller pin is inserted,
wherein the pin hole has an inner circumferential surface with a predetermined curvature as a pin contact surface, and due to the curvature, a contact section and a non-contact section are formed between the inner circumferential surface of the pin hole and an outer circumferential surface of the roller pin so that relative movement of the roller and relative movement of the roller pin are generated between the roller and the roller pin.

2. The S-cam brake system of claim 1, wherein the curvature is formed with a convex protrusion of the pin contact surface as a peak.

3. The S-cam brake system of claim 1, wherein the protrusion is disposed at a position corresponding to ½ of an overall length of the roller.

4. The S-cam brake system of claim 1, wherein the relative movement of the roller makes rotation of the roller relative to the roller pin.

5. The S-cam brake system of claim 4, wherein the rotation of the roller converts a defective partial contact state of the roller due to a machining tolerance error into a contact state of the roller.

6. The S-cam brake system of claim 1, wherein the relative movement of the roller pin makes rotation of the roller pin relative to the roller.

7. The S-cam brake system of claim 6, wherein the rotation of the roller pin converts a defective concentric close contact state of the roller pin due to a machining tolerance error into a close contact state of the roller pin.

8. The S-cam brake system of claim 1, wherein the roller and the roller pin that are coupled to each other are assembled with a retainer, and the retainer that is fixed to the roller pin locks a side surface of the roller in place.

9. The S-cam brake system of claim 8, wherein the roller pin comprises:
a pin body inserted into the pin hole; left and right pin ends extending from respective left and right sides of the pin body to protrude out of the roller; and an annular groove formed around a circumferential surface of each of the left and right pin ends, wherein the retainer comprises left and right retainers respectively fitted into the annular groove of the left pin end and the annular groove of the right pin end.

10. The S-cam brake system of claim 8, wherein the roller, the roller pin and the retainer form a roller assembly, and an S-cam brake includes the roller assembly.

11. A vehicle comprising:
the S-cam brake system of claim 1, wherein the S-cam brake system further comprises:
a brake chamber into which compressed air is supplied,
a slack adjuster configured to be pushed by the brake chamber, and
an S-cam configured to be rotated by the slack adjuster and push the roller.

12. The vehicle of claim 11,
wherein the S-cam brake system comprises a pair of first and second roller assemblies, each of which comprises the roller and the roller pin, and
wherein the S-cam brake system comprises a pair of left and right shoes, and
wherein the first roller assembly is disposed on the left shoe on a left side of the S-cam and configured to push the left shoe, and the second roller assembly is disposed on the right shoe on a right side of the S-cam and configured to push the right shoe.

13. The vehicle of claim 12, wherein the roller is configured such that rotation of the roller relative to the roller pin and rotation of the roller pin are generated.

14. The vehicle of claim 13, wherein, while the roller of each of the first and second roller assemblies makes contact with a corresponding one of left and right cam head outer surfaces of the S-cam, the rotation of the roller converts a defective partial contact state of the roller relative to the corresponding one of the left and right cam head outer surfaces into a contact state of the roller, and, while the roller pin of each of the first and second roller assemblies makes contact with a corresponding of the left and right shoes, the movement of the roller pin converts a defective concentric close contact state of the roller pin relative to the corresponding one of the left and right shoes into a close contact state of the roller pin.

15. The vehicle of claim 11, wherein the compressed air is generated by a pneumatic apparatus when a brake pedal is operated.

16. The vehicle of claim 11, wherein the operation of pushing the slack adjuster is embodied by coupling of a chamber push rod of the brake chamber to the slack adjuster, and the rotation of the S-cam is performed when a cam shaft extending from a central portion of an "S"-shaped cam head of the S-cam is rotated by the slack adjuster.

17. The vehicle of claim 11, wherein the S-cam brake system is installed on a left wheel, and another S-cam brake system is installed on a right wheel.

\* \* \* \* \*